United States Patent [19]

Mertens

[11] Patent Number: 5,629,568

[45] Date of Patent: May 13, 1997

[54] CONTROLLABLE DRIVE UNIT WITH COMBUSTION ENGINE AND GENERATOR

[75] Inventor: Jurgen Mertens, Paderborn, Germany

[73] Assignee: Icemaster GmbH, Paderborn, Germany

[21] Appl. No.: 416,736

[22] PCT Filed: Oct. 11, 1993

[86] PCT No.: PCT/EP93/02778

§ 371 Date: Jun. 5, 1995

§ 102(e) Date: Jun. 5, 1995

[87] PCT Pub. No.: WO94/09327

PCT Pub. Date: Apr. 28, 1994

[30] Foreign Application Priority Data

Oct. 12, 1992 [DE] Germany ............... 42 34 340.2
May 8, 1993 [DE] Germany ............... 43 15 362.3

[51] Int. Cl.[6] ............................................. F02D 45/00
[52] U.S. Cl. ............................................. 290/40 R
[58] Field of Search ........................ 290/40 C, 40 R, 290/40 A, 40 B, 40 D, 40 E

[56] References Cited

U.S. PATENT DOCUMENTS

| 4,240,145 | 12/1980 | Yano et al. ............... 364/431.07 |
|---|---|---|
| 4,281,567 | 8/1981 | Maurer ............... 60/448 |
| 4,414,818 | 11/1983 | Turbard et al. ............... 62/176.1 |
| 4,853,553 | 8/1989 | Hosie ............... 290/40 C |
| 4,991,400 | 2/1991 | Wilkinson ............... 62/228.4 |
| 5,140,826 | 8/1992 | Hanson et al. ............... 62/115 |

FOREIGN PATENT DOCUMENTS

| 0093930 | 11/1983 | European Pat. Off. . |
|---|---|---|
| 0152121 | 8/1985 | European Pat. Off. . |
| 0435535 | 7/1991 | European Pat. Off. . |
| 9213380 | 8/1992 | WIPO . |

*Primary Examiner*—Steven L. Stephan
*Assistant Examiner*—Christopher Cuneo
*Attorney, Agent, or Firm*—Browdy and Neimark

[57] ABSTRACT

A system of an internal combustion engine (VM) with rpm actuator (DRS), a refrigerator (AM) and a direct drive mechanically coupling the engine to the refrigerator, and a control unit including a thermostat for maintaining the internal temperature of the refrigerator at a predetermined set point value (SW), is improved by (a) a refrigerator thermostat setting, (b) a refrigerator external temperature sensor coupled, and (c) an engine speed tachometer (DM), all coupled to the control unit; (d) the control unit determining an optimal engine rpm from the inputs and characteristic function stored in a memory device (ST) of the control unit; and (e) the rpm actuator adjusting the rpm to the optimal rpm value.

21 Claims, 2 Drawing Sheets

CONTROLLABLE DRIVE UNIT WITH COMBUSTION ENGINE AND GENERATOR

FIELD OF THE INVENTION

The invention relates to a drive unit for an operating device consisting of an internal combustion engine and a machine driven by it and an electrical consumer, wherein the output to be provided fluctuates with demand. Possible machines for this are, for example, pumps, compressors, generators, drive units etc. in the most varied operating devices.

DESCRIPTION OF THE RELATED ART

Such drive units are controlled in such a way that the internal combustion engine is respectively switched off when the actual value of a quantity to be controlled exceeds a predetermined set value in either direction, and it is started up again when the actual value of the controlled quantity exceeds the set value by a predetermined difference in either direction, i.e. with a hysteresis, after which the internal combustion engine and the drive unit are then operated at full load rpm.

Such a two-point control operation has many disadvantages. The engine is often operated at low temperatures in the start-up phase, which results in a loss of efficiency and an increase in pollutants in the exhaust gas as well as increased wear. Further than that, loud noise is generated since operation is at full load rpm.

A drive unit for a heat pump with an internal combustion engine which drives a compressor and a generator is known from EP-A 0 152 121, wherein a measurement of the output requirements and a corresponding rpm regulation of the internal combustion engine is provided there.

SUMMARY OF THE INVENTION

Based on this state of the art, it is the object of the invention to create a drive unit with a further optimized degree of efficiency which allows a silent, environmentally friendly, economical and material-saving operation.

This object is attained in that the difference between the actual value of the controlled quantity and the actual value, as well as the parameters affecting the controlled quantity, are measured, wherein the respective output requirements are determined from output requirement coefficients assigned to these measured values. In accordance with this, a characteristic output curve for the engine rpm is then determined from characteristic values stored in a control device and is supplied to the internal combustion engine for regulating its rpm.

An electrical generator, which directly and/or via at least one voltage and frequency converting unit supplies electrical consumers, is additionally coupled with the internal combustion engine. Synchronous and asynchronous three-phase current generators are used in this connection. The electrical output is measured and is reported via an appropriate signal to the control unit and is added to the output requirements there. It is furthermore provided that in the rare cases where there is no demand for output or where it is so small that the internal combustion engine provides an unnecessary amount of output even at idle speed, a controlled disconnection of the engine takes place. In the process the electrical installation continues to be operated by the internal combustion engine. As soon as there is a demand for output again, the connection is restored and work is resumed.

The demand determination is converted into engine rpm in that, for example, data from a table of a characteristic output curve in relation to the rpm are stored in the control device, wherein the respective optimum rpm are determined by means of a poll and possibly additionally by means of an interpolation from the table values of the characteristic line.

The set rpm are provided to an rpm control device of the internal combustion engine in the form of a set signal. An rpm signal derived from the engine is supplied to the control device in the form of an actual signal. The difference with the rpm set value is then provided by the control device to an rpm actuator of the internal combustion engine. In a Diesel engine this rpm actuator can be a servo motor for a stroke adjustment of a fuel injection device, for example.

The output requirement coefficients of the parameters which have an effect on the control quantity are determined on the basis of experimental values or are exactly calculated at the time of placing the entire device into operation, if this is possible. These coefficients are advantageously optimized by means of a learning program.

In accordance with the invention, the internal combustion engine is operated at very low rpm near its lower permissible rpm limit. Because of this it maintains its operating temperature, generates little noise and has a high degree of efficiency. In its size and its output dimensions the internal combustion engine can be designed to meet an average value which lies considerably below the peak load, if the latter only occurs seldom, since in this way engines can tolerate peak loads increased in this way for short periods of time.

The operational values, such as pollutant emission and fuel consumption, are also suitably optimized to fit an average operation. This results in considerable advantages and fuel savings in contrast to the design for maximum operation.

The use of this controllable drive unit is particularly advantageous in connection with cooling installations for a chamber to be cooled, in particular the interior of a refrigerated transport vehicle, bus or the like having an internal combustion engine and a compressor driven by it with a coolant circuit connected to it, which comprises a condenser, an expansion valve and at least one evaporator, whose return line is run back to the aspiration side of the compressor, wherein the cooling output in relation to a predetermined set temperature is thermostatically controlled by means of an interior thermometer.

Such cooling installations are generally known. They are controlled so that the compressor is respectively switched off when the interior temperature of the refrigerated chamber falls below a predetermined set temperature and it is turned on again when the interior temperature exceeds the set temperature by a predetermined difference, i.e. with a hysteresis, whereupon the engine and the compressor are again operated at full load rpm. This two-point control operation of the cooling installation has many disadvantages. The engine is often operated at low temperatures in the start-up phase, which results in a loss of efficiency and an increase in pollutants in the exhaust gas as well as increased wear. Furthermore, loud noise is generated since operation is at full load rpm. Also, at high cooling output and when only a small output in the medium is required, condensation occurs at the evaporator, which leads to an undesired increase in moisture in the cooled air, which can cause corrosion and which, particularly in buses, is unhealthy for the passengers.

The respective cooling output requirements are determined respectively from a difference between the measured interior temperature and the set temperature as well as from a difference between the exterior temperature, which is continuously measured by means of at least one outside thermometer, and the set temperature, and from the cooling requirement coefficients of the installation to be cooled assigned to these coefficients, and in accordance with this a set engine rpm is determined from characteristic values of a cooling output engine rpm characteristic curve stored in a control device and is provided to the internal combustion engine for controlling its rpm.

The cooling circuit only requires a small reservoir for the cooling medium. The size and output dimensions of the Diesel engine can be designed to meet an average value which lies considerably, for example by 30 to 40%, below the peak load, which only occurs for a few hours per year under extreme weather conditions, since engines can tolerate such increased peak loads for only a short time. The operational values, such as pollutant emission and fuel consumption, are also suitably optimized to fit an average operation. This results in considerable advantages and fuel savings in contrast to the design for maximum operation.

It is further advantageously provided that in the rare cases where there is no demand for cooling output or where it is so small that the internal combustion engine provides an unnecessary amount of output even at idle speed, turn-off or disconnection of the engine takes place. Since only a small condenser reservoir has been provided, the respective subsequent restarting or re-connection of the engine will take place practically without counterpressure from the compressor, because the condensate then is already completely evaporated and pressure equalization prevails in the cooling circuit.

The cooling output requirement is continuously determined from the difference between the exterior skin temperature of the cooling chamber and is determined in a supplementary manner by a difference between the interior temperature and the set temperature, which is necessary when materials to be cooled have been recently placed inside or particularly in case of heat sources in the cooling chamber, for example in case of people.

Furthermore the energy output of a possibly present electrical on-board circuit is continuously monitored and included in the cooling output requirements.

Beside a measurement of the exterior temperature of the surface of the cooling chamber, it is suitably provided to perform a radiation measurement of incoming infrared radiation, in particular sunlight, on the various surfaces of the refrigerated vehicle, particularly the window areas, so that the radiation portion can be directly included in the calculation of cooling output requirements.

The inclusive cooling output requirement report makes it possible to provide as exactly as possible an adaptation of the compressor rpm to the respective requirements, so that practically no stoppage of the driving engine need take place. The requirements determination is converted into engine rpm or compressor rpm in that, for example, data from tables of a characteristic cooling output curve in relation to the rpm is stored in the control device and the respectively optimum rpm are determined by means of an interrogation and possibly additionally by an interpolation from the table values of the characteristic curve.

The set rpm are provided to an rpm regulating device of the internal combustion engine as the set signal. The rpm regulator can also be an integrated part of the control device. The latter is provided with an rpm signal derived from the engine or the compressor as the actual value. The difference with the rpm set value is then provided by the control device to an rpm actuator of the Diesel engine. This rpm actuator is for example a servo motor for a stroke adjustment of a fuel injection device.

In case the exterior temperature is considerably lower than the predetermined interior temperature there is the possibility that cooling is no longer required, so that it is then provided that the engine with the compressor is completely stopped or is uncoupled. In this connection there is a continuous comparison of the interior temperature with a lower temperature threshold value and when this falls below it, the engine is switched off or disconnected. As soon as the lower temperature threshold is again exceeded by a predetermined amount, the driving engine is started or connected and the compressor is thereby put back into operation.

In accordance with the invention, an electrical three-phase current generator is connected with the driving engine and operates the blowers in the evaporator and condenser, which is of great importance, particularly when the vehicle is operated in idle. Since the engine only turns slowly during low cooling output, the generator also delivers a three-phase current of lower frequency, so that the blowers also turn slowly in adaptation to the low cooling requirements and use little energy and make little noise.

In addition, the generator can supply in an advantageous manner an on-board circuit of the bus or vehicle via a voltage and frequency conversion device, so that the main engine can be turned off even during prolonged stops and the airconditioning engine with the generator supplies the lighting system, the sound system, etc. via the converter.

In a further embodiment the generator is fixedly coupled with the driving engine and the compressor is connected with it via a controllable clutch. In this way it is possible to disengage the clutch when the lower temperature threshold value is downwardly exceeded, while the electrical system continues to be operated by the driving engine. As soon as a renewed cooling demand is generated, the clutch is reconnected and cooling operations begun.

For calculating the cooling output from the temperature differences between the set temperature and the measured interior temperature and the measured exterior temperature, as well as from a radiation measurement and an electrical output consumption, associated output coefficients are determined, which have been obtained from the surface values, the insulation and radiation resorption coefficients as well as the experimental values of the heat transfer from the exterior air to the surface during stops and operation while moving. When the entire device is started, the coefficients are determined on the basis of experimental values. These coefficients are advantageously optimized by means of a learning program which, respectively as a function of the appearance of the requirements for stopping the cooling unit and as a function of exceeding the set temperature by a predetermined value within observations periods, which are greater than the thermal time constants of the heat transfer through the insulation layer, makes corrections which incrementally counter the amount of upward or downward excess, and thereby optimizes successively.

All of the above measures result in an optimally comfortable climatic adjustment, particularly in airconditioning units of passenger vehicles, in which the interior temperature only shows very slight fluctuations since practically no compressor shut-off takes place and the operation of the evaporator is performed by means of a moderate evaporation output, so that there is practically no icing and there is only a limited increase in the humidity of the exhaust air from the evaporator.

Most electrical consumers, such as electric motors, are designed in such a way that they can operate within a defined frequency bandwidth and voltage bandwidth. This frequency range lies, for example in Europe, between 45 Hz and 55 Hz. With an appropriate design of the electric motors, the range can be correspondingly greater, for example it can cover a range between 40 Hz and 60 Hz. With an incandescent lamp the current frequency within this frequency range is of no consequence at all. This permissible frequency bandwidth therefore represents a control range for adaptation to load changes, wherein converters (rectifiers) are not needed.

The generator frequency is controlled by the control device within the permissible frequency bandwidth, and thus also the output voltage and the current via the engine rpm of the internal combustion engine, in such a way that the electrical output of the generator corresponds to the actual load requirements.

Employment of the controllable drive unit in accordance with the invention is of interest in all cases where machines are used which require current and are employed in changing locations with and without connections to the power lines. If there is no connection to the power lines, current is supplied by means of the generator by the rpm-controlled internal combustion engine.

The controllable drive unit can also be employed in an advantageous manner in connection with a wind power installation.

BRIEF DESCRIPTION OF THE DRAWING

Exemplary embodiments are represented in the drawings and will be described in detail below. Shown are in.

DETAILED DESCRIPTION OF THE PREFERRED EMBODIMENTS

Figure 1:
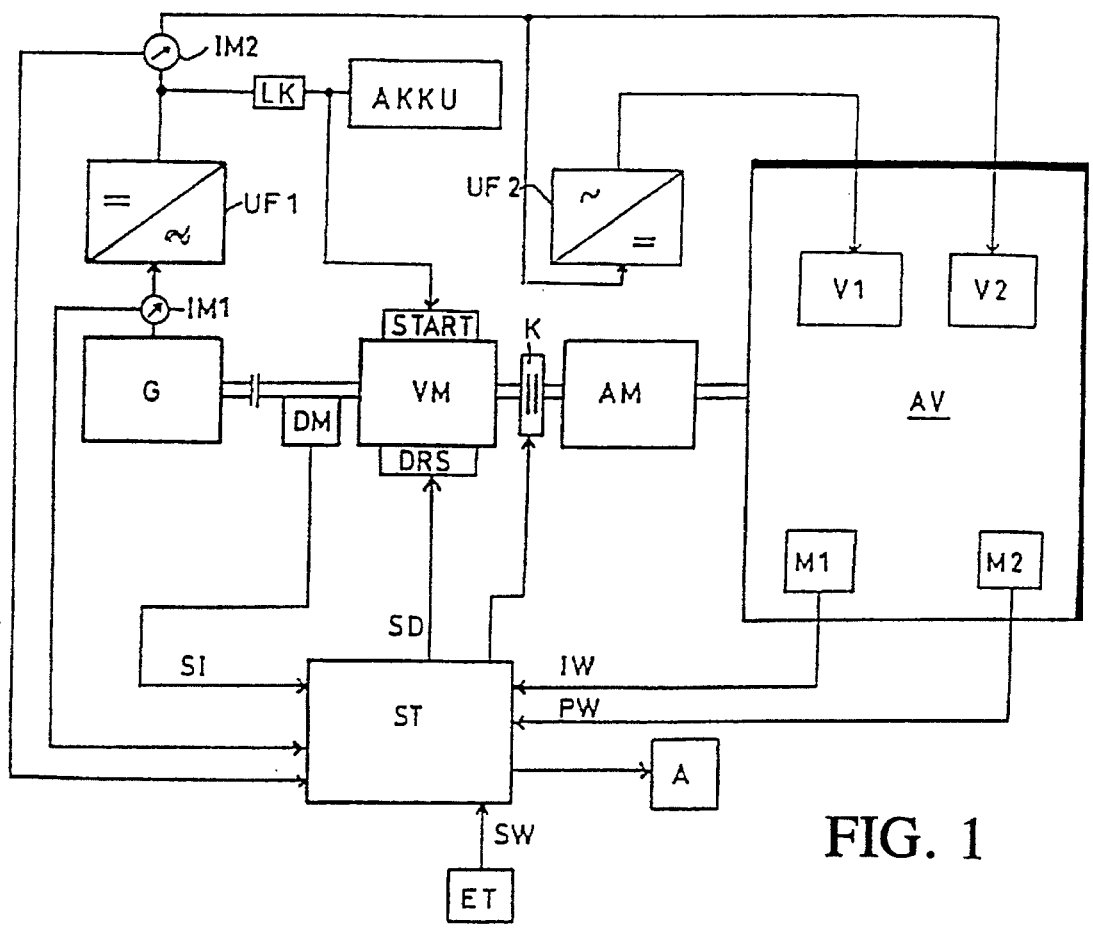
FIG. 1, a block circuit diagram of a first embodiment.

FIG. 1 shows an internal combustion engine (VM), which usually is a Diesel engine, to which a machine (AM) is flanged and drives an operating device (AV). A control device (ST) is provided for the continuous output calculation, which is connected on the input side with an actual value sensor (M1) for a controlled quantity as well as with one or several value sensors (M2) for parameters (PW) affecting the controlled quantity. It is furthermore advantageously provided to input a set value (SW) for the controlled quantity into the control device (ST) by means of an input keyboard (ET). The control device (ST) contains a suitably programmed microprocessor containing output requirement coefficients and a table correlating the rpm of the machine (AM) with the operating output in its memory. Output requirement coefficients are assigned to the measured actual value (IW) of the controlled quantity and the measured parameter values (PW) as a function of the predetermined set value (SW). From these coefficients the control device (ST) determines the set rpm of the internal combustion engine (VM).

The engine rpm are picked up at the engine shaft by a tachometer (DM) and a corresponding actual rpm signal (SI) is supplied to the control device (ST). From the difference with the engine rpm, the control device determines an output signal (SD), which directly actuates an rpm actuator (DRS) of the internal combustion engine (VM). If the control of a Diesel engine is involved, the rpm actuator (DRS) preferably sets the stroke of the injection device by means of a servo motor.

An electrical generator (G), preferably a three-phase current generator, is disposed on the engine shaft. It supplies an electric consumer (V2) and a battery (AKKU) directly and/or indirectly via a converter (UF1), which delivers a standardized d.c. voltage. The charge current for the battery (AKKU) flows via a charge control circuit (LK) and is disrupted by it when the battery (AKKU) is completely charged. The converter (UF1) and/or the battery (AKKU) supply a further converter (UF2), which outputs a predetermined voltage of a predetermined frequency (for example 200 V, 380 V and 50 Hz, 60 Hz) to one or several consumers (V1). A current measuring device (IM1) is located downstream of the generator (G), whose measuring signal is proportional to the electrical output taken and is supplied to the control device (ST) as a further input signal for output calculation. In addition to this, a further current measuring device (IM2) is provided, which determines the electrical output taken from the battery (AKKU) and the converter (UF1) and whose measuring signal is also provided to the control device (ST).

A clutch (K) is disposed between the machine (AM) and the internal combustion engine (VM), which can be operated by the control device (ST). In this way the machine (AM) can be disconnected when there is no demand for mechanical work output. However, the generator (G) continues to be driven by the internal combustion engine (VM). To compensate the output peaks at the generator (G) occurring when the machine (AM) is connected and disconnected, the former is preferably equipped with a flywheel.

The battery (AKKU) is used as a buffer during load fluctuations, until the internal combustion engine (VM) is readjusted. It can be relatively small for this. But it can also be used for bridging during frequent long periods of low load, wherein the internal combustion engine (VM) is turned off and is automatically electrically started via the starter (START) by the battery (AKKU) before its charge is depleted.

Besides the actual value (SW), it is also possible to enter calculating coefficients as well as a lower and an upper threshold value for the controlled quantity into the control device (ST) by means of the input keyboard (ET). Furthermore, an output device (A), for example an LCD display, is provided for displaying the respectively predetermined set value (SW) as well as the respective actual value (IW).

Preferably the converters (UF1, UF2) are equipped in a known manner with semiconductor switches, capacitors and throttles, so that they contain no mechanically wearing parts.

Figure 2:
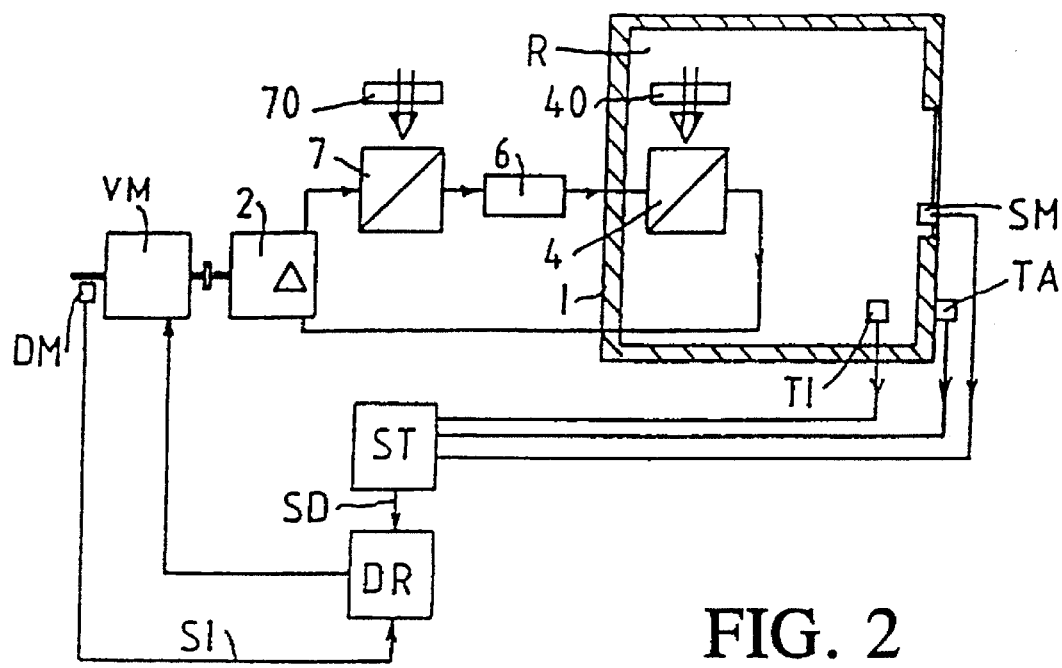
FIG. 2, a block circuit diagram of a second embodiment.
Figure 3:
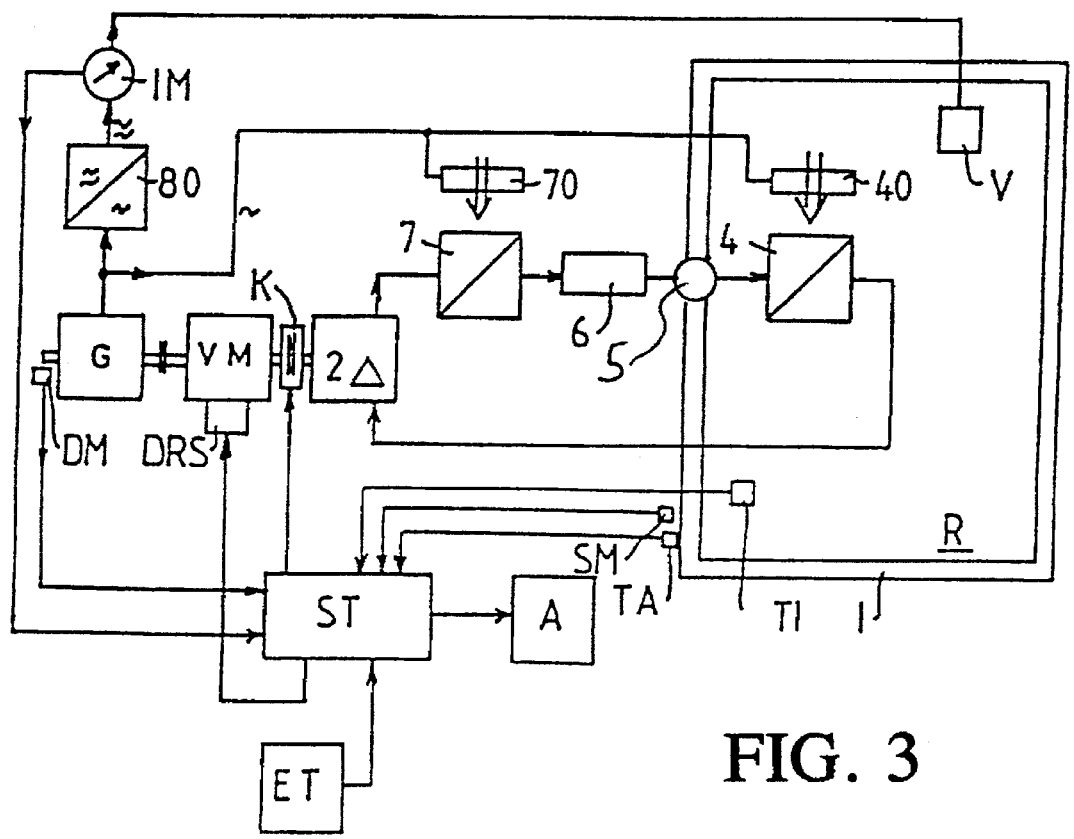
FIG. 3, a block circuit diagram of a third embodiment.

A controllable drive unit, in particular for cooling devices, is schematically represented in FIGS. 2 and 3.

FIG. 2 shows an embodiment without a generator, which is not a part of the invention.

FIG. 2 shows an internal combustion engine (VM), which normally is a Diesel engine, on which a compressor (2) is flanged, which supplies a coolant circuit. The coolant is supplied in the compressed state to a condenser (7), from which the condensate runs into a condensate reservoir (6), from which it enters the evaporator (4) through an expansion valve (5), from where the expanded coolant gas flows back through the aspirating side into the condenser. The evaporator is located in a cooling chamber (R) which is enclosed on all sides by insulation (I). In case the cooling chamber (R) is the interior of a bus, it consists partially of glass surfaces, of course, a part of which are pervious to heat radiation, so that the radiation heat must also be removed by means of the cooling device. Associated blowers (40, 70) are provided for the effective removal of cold or heat from the evaporator (4) or the condenser (7) and are electrically driven. Compared with conventional cooling installations, the reservoir (6) is designed to have a very low capacity, because the cooling device operates continuously and therefore practically no storage of coolant is needed.

A control device (ST) is provided for continuous cooling output calculation, whose input side is connected with an interior thermometer (TI), Several exterior thermometers (TA) disposed on the exterior skin of the cooling chamber (R), one or several heat radiation measuring devices (SM), which are assigned to the window surfaces in particular. A suitably programmed microprocessor is disposed in the control device (ST) and contains in a memory the output coefficients as well as a table representing the correlation of the compressor rpm with the cooling output. On the output side the control device (ST) supplies a signal representing the set rpm (SD) to an rpm regulator (DR) which, on the other side, is supplied with an actual rpm signal (SI) which had been taken off the compressor or engine shaft by means of a tachometer (DM). The difference signal from the rpm regulator acts on the supply of the internal combustion engine.

FIG. 3 shows a further embodiment of the device, wherein an electrical generator (G), which preferably is a three-phase current generator, is disposed on the engine shaft. It supplies the three-phase current blowers (40, 70), so that their rpm are proportional to the engine rpm and therefore proportional to the cooling output requirements. In addition, the generator (G) supplies a converter (80), which outputs a standardized voltage of a standardized frequency which supplies an on-board circuit (V) having consumers, such as lights, audio system and signal devices. The on-board circuit (V) is passed over a current measuring device (IM), whose measuring signal is proportional to the electrical output taken up and is supplied to the control device (ST) as a further input signal for calculating the cooling output.

In the example provided, the function of the rpm regulator is integrated in the control device (ST), for which reason the rpm measuring signal of the tachometer (DM) is supplied to the control device (ST) as a further input signal. The output signal of the control device (ST) directly actuates an rpm actuator (DRS) which, if this relates to the control of a Diesel engine, preferably sets the stroke of the injection device by means of a servo motor. A keyboard (ET), which is served by means of an input program of the microprocessor, is connected at the input side of the control device for entering the various cooling requirement calculation coefficients, including the surface values, the specific insulation values, the window areas, the specific radiation absorption, etc., as well as the compressor characteristic in relation to its rpm.

The respectively desired set temperature as well as the lower temperature threshold value are furthermore entered by means of the input keyboard (ET). An output device (A), for example a digital display, is used for the control of the entered data and for the display of the respectively predetermined set temperature as well as the respective interior temperature.

As illustrated, it is provided in a special embodiment that a clutch (K) is disposed between the compressor (2) and the engine (VM), which can be actuated by means of an actuating signal from the control device (ST). In this way the electrical generator (G) can be operated by the engine (VM), even if there is no requirement for cooling output, or if only the cooling output from the coolant contained in the reservoir (6) is converted, wherein the blower (40) conveys the cooled air from the evaporator (4) into the cooling chamber (R).

Preferably the converter (80) is equipped in a known manner with semiconductor switches, capacitors and throttles, so that it contains no mechanically wearing parts.

Most electrical consumers, such as electric motors (blowers, compressors), are designed in such a way that they can operate within a defined frequency bandwidth around a rated frequency ($f_N$) between a lower frequency value ($f_u$) and an upper frequency value ($f_o$). This frequency range lies, for example in Europe, between 45 Hz and 55 Hz. With an appropriate design of the electric motors, the range can be correspondingly greater (for example between 40 Hz and 60 Hz). With an incandescent lamp the current frequency within this range is of no consequence at all. This permissible frequency bandwidth therefore represents a control range for adaptation to load changes, wherein a converter (rectifier) is superfluous.

With a synchronous generator, the output voltage ($U_a$) is proportional to the rpm with which the generator (G) is driven. With a load change, the output voltage ($U_a$) of the generator (G) is adapted to the actual load by the rpm change of the internal combustion engine (VM) which drives the generator (G). Within the permissible frequency bandwidth, the frequency change occurring as a result of this does not hamper the function of the electrical consumers. The output voltage ($U_a$) of the generator is measured and supplied to the control device (ST). From the stored generator rating data and the generator frequency (f), the control device (ST) determines a generator set voltage ($U_s$).

The deviation of the generator output voltage ($U_a$) from the generator set voltage ($U_s$) occurring because of the inner resistance ($R_G$) of the generator when a current (I) flows in the case of a load is used for determining the current value and is correspondingly taken into consideration during adjustment. The connection is described by the following equation:

$$U_a = U_s - I \cdot R_G.$$

The generator (G) is adjusted by means of the frequency (f) in such a way that it is operated close to the lower frequency ($f_u$) at low loads and, with increasing output requirements, increasing current (I) the set frequency ($f_s$) is increased. This is expressed by means of the following equation:

$$f_s = f_u + (f_o - f_u) \cdot I/I_{Max}$$

In this case, $I_{Max}$ is the current supplied by the generator if it is operated at the upper frequency ($f_o$).

In the following claims, "refrigerator" means a cooling installation for a chamber to be cooled, and "generator" means an electrical DC generator or AC alternator.

What is claimed is:

1. In a controllable drive unit operating device including
an internal combustion engine (VM) able to rotate at an rpm and including an rpm actuator (DR, DRS) for controlling the rpm of the engine,
a refrigerator (AM) and a direct drive mechanically coupling the engine to the refrigerator,
a control unit including
thermostat means for maintaining an internal temperature of the refrigerator at a predetermined set point value (SW), the improvement comprising:
(a) refrigerator internal temperature setting input means coupled to the control unit;
(b) a sensor of a refrigerator external temperature, the sensor being coupled to the control unit;
(c) a tachometer (DM) disposed on the engine for measuring an engine speed, the tachometer being coupled to the control unit;
(d) the control unit including means for accepting
the refrigerator internal temperature setting,
the external temperature, and
the engine speed measured by the tachometer,
and for determining therefrom an optimal value of the engine rpm according to values of an output characteristic function stored in a memory device (ST) of the control unit; and
(e) means for causing the rpm actuator to adjust the rpm toward the optimal value determined by the control unit.

2. The improvement according to claim 1, wherein the control unit includes self-learning means to adjust the characteristic function.

3. The improvement according to claim 1, wherein the refrigerator includes an evaporator blower motor (40) and a condenser blower motor 70), and the improvement comprises:
an electrical generator (G) directly coupled mechanically to the engine and directly coupled electrically to the evaporator blower motor (40) and the condenser blower motor (70), whereby the evaporator blower motor (40) and a condenser blower motor (70) turn at rotational speeds corresponding to the engine rpm.

4. The improvement according to claim 3, wherein the generator is a three-phase generator and the evaporator blower motor (40) and the condenser blower motor (70) are three-phase blower motors.

5. The improvement according to claim 4, wherein the generator (G) supplies a converter (UF1), which supplies a predetermined three-phase voltage to at least one electrical load.

6. The improvement according to claim 5, wherein the characteristic function includes the electrical load and the internal temperature of the refrigerator as independent variables.

7. The improvement according to claim 4, comprising means for comparing a respectively measured actual value (IW) of the internal temperature with a predetermined threshold value which lies above or below the respectively predetermined set point value by a predetermined difference and then, when the actual value (IW) falls above or below the threshold value, disconnecting the internal combustion engine (VM) in a controlled manner from the refrigerator (AM) via a clutch (K), while the three-phase current generator (G) continues to be driven and, when thereafter the actual value has again attained the predetermined set point value, again connecting the internal combustion engine (VM) in a controlled manner with the refrigerator (AM).

8. The improvement according to claim 5, wherein the electrical load includes a battery (AKKU) and the improvement comprises means for charging the battery, and wherein
the charge current (IL) for the battery (AKKU) is switched off by a charge control circuit (LK) as soon as the battery (AKKU) is fully charged.

9. The improvement according to claim 5, wherein the electrical output taken from the three-phase current generator (G) is determined by means of a current measuring device (IM1) and/or the electrical output taken from the battery (AKKU) and the converter (UF1) is determined by a current measuring device (IM2) and is added to the output requirements in the memory device (ST).

10. The improvement according to claim 1, wherein when there is no requirement for mechanical work output or only a low requirement for electrical output, the internal combustion engine (VM) is switched off in a controlled manner, wherein the battery (AKKU) is then used for bridging the current supply and electrically starts the internal combustion engine (VM) by means of a starter (START) before its charge is depleted.

11. The improvement according to claim 5, wherein the three-phase current generator (G) includes a flywheel with an appropriate mass for compensating output peaks during disconnection from and connection to the refrigerator (AM) of the internal combustion engine (VM).

12. The improvement according to claim 5, wherein a generator frequency (f) is controlled via the engine rpm by the memory device (ST) within a permissible frequency bandwidth between a lower frequency value (fu) and an upper frequency value ($f_o$) around a rated generator frequency ($f_N$) in such a way that a generator output voltage is matched to a respective electrical output consumption.

13. The improvement according to claim 1, wherein the refrigerator includes a cooling chamber (R) having a cooling device therefor, a compressor (2) driven by the engine, and a coolant circuit connected to the cooling device including a condenser (7), an expansion valve (5) and at least one evaporator (4), a return line of which is brought back to an aspirating side of the compressor (2), and an interior thermometer (TI) and an exterior thermometer (TA), and, means for determining a respective cooling output requirement from a difference between the measured interior temperature and the set point value as well as from a difference between the exterior temperature, which is continuously measured with the exterior thermometer (TA), and the set point value, and from cooling output requirement coefficients assigned to differences thereof and, in accordance therewith, determining the optimal value of the engine rpm from characteristic values of the characteristic function for cooling output engine rpm stored in the memory device (ST) and is supplied to the rpm actuator (DR) of the internal combustion engine (VM).

14. The improvement according to claim 13, wherein a plurality of the exterior thermometer are disposed on surfaces of various outside areas of the cooling chamber.

15. The improvement according to claim 13, comprising at least one exterior heat radiation measuring device (SM) disposed on the cooling chamber, a respective radiation measuring signal of which is linked with a radiation penetration coefficient of window surfaces and means for adding the measuring signal to the cooling output requirements.

16. The improvement according to claim 13, wherein the memory device (ST) includes the rpm actuator (DR) and the rpm actuator is supplied with an rpm signal from the tachometer (DM) disposed on the internal combustion engine (VM), a difference in respect to a respective motor set rpm is supplied to the rpm actuator (DRS) of the engine (1).

17. The improvement according to claim 1, wherein the rpm actuator (DRS) comprises a stroke adjustment device of a fuel injection device.

18. The improvement according to one of claim 13, wherein in the memory device (ST) the respectively measured interior temperature is compared with a predetermined lower temperature threshold value lying a predetermined temperature difference below the set point value and, when the interior temperature falls below the lower temperature threshold value, the internal combustion engine (VM) is switched off or disconnected from the compressor (2) in a controlled manner and when thereafter the interior temperature has again reached the set point value, the internal combustion engine (VM) is started again or connected to the compressor (2) in a controlled manner.

19. The improvement according to claim 13, wherein the generator (G) supplies a converter circuit (80) which delivers a predetermined voltage and frequency to an on-board circuit (V) of a bus or vehicle.

20. The improvement according to claim 13, including means for determining respectively the electrical output taken up by the on-board circuit (V) by a current measuring device (IM) reporting to the memory device (ST) and adding to the respective cooling output requirements in the memory device (ST).

21. The improvement according to claim 13, including means for storing cooling output requirement coefficients in the memory device (ST) and respectively at a time of a stoppage of the compressor (2) and respectively at a time the set point value is exceeded by a predetermined amount, such that an incremental increase or decrease of a corresponding cooling output requirement coefficient in an opposite direction takes place via an optimization program.

* * * * *